United States Patent [19]

Ott

[11] 4,364,586
[45] Dec. 21, 1982

[54] STATUS RECORD SYSTEM

[76] Inventor: Clyde E. Ott, c/o Pace Precision Tool & Die Co., Inc., Ohio Ave., DuBois, Pa. 15801

[21] Appl. No.: 171,198

[22] Filed: Jul. 22, 1980

[51] Int. Cl.³ .................. B42D 15/00; B42F 21/00
[52] U.S. Cl. .................................... 283/55; 283/18; 40/360
[58] Field of Search .................. 283/55, 44, 35, 36, 283/39, 66 R, 3, 37, 65, 18; 282/29 A, 29 R; 40/124, 382, 171, 340, 359, 371, 360; 402/79

[56] References Cited

U.S. PATENT DOCUMENTS

| | | | |
|---|---|---|---|
| 521,882 | 6/1894 | Himrod | 283/42 |
| 1,129,931 | 3/1915 | Wexler | 283/3 |
| 1,267,407 | 5/1918 | Harrison | 283/18 |
| 1,751,495 | 3/1930 | Robinson | 40/360 |
| 2,582,729 | 1/1952 | Wassell | 40/360 |
| 3,081,112 | 3/1963 | Schuessler | 283/66 R |

Primary Examiner—Paul A. Bell
Assistant Examiner—John S. Brown
Attorney, Agent, or Firm—Frank B. Robb

[57] ABSTRACT

A status record system in which master record cards and a series of operation description status cards associated with each, is provided to furnish significant information with flexibility to inform a user of certain manufacturing aspects, involving for example, sales, inventory, material and supplies, the status of each being quickly ascertained and readily changed to maintain records as events occur to assist in coordinating the production of parts or mechanisms, status information being furnished by the size, shape, relationship and position of status cards with suitable indicia, readily observable to quickly pinpoint areas requiring attention and those which have been attended to as well as those which do not momentarily demand such attention, the indicia being arranged in a helpful relationship for information purposes.

1 Claim, 6 Drawing Figures

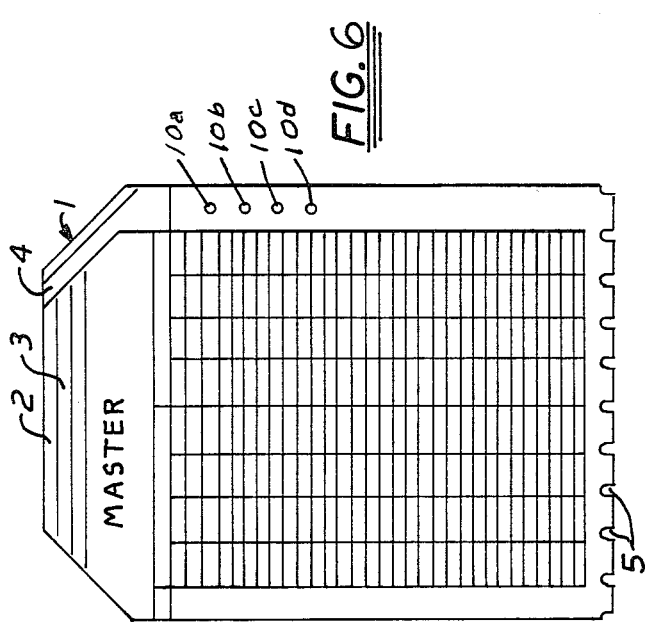
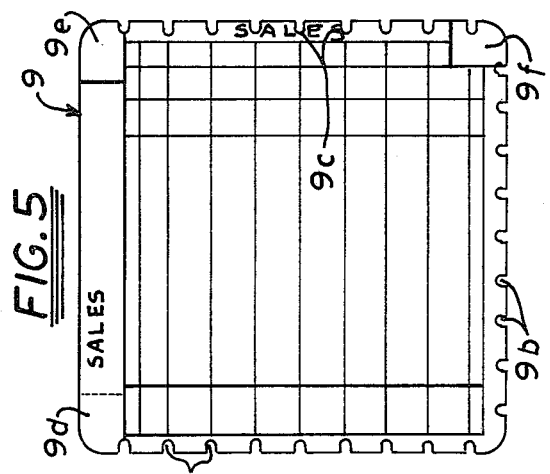
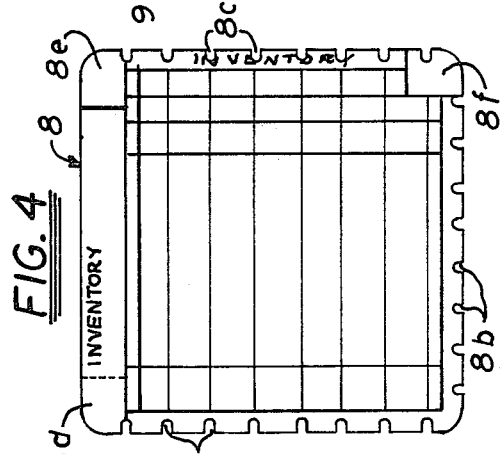
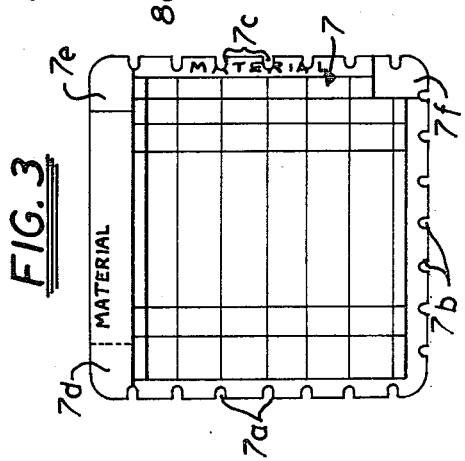
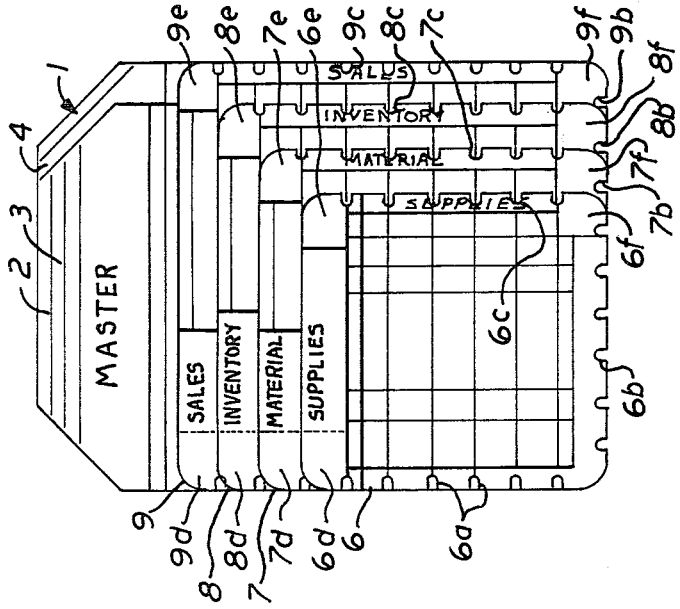
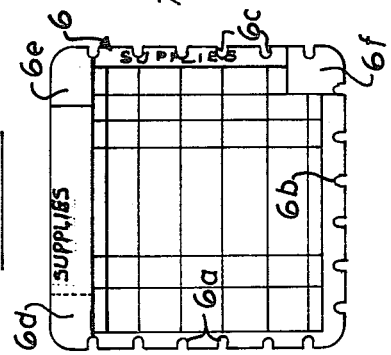

STATUS RECORD SYSTEM

BACKGROUND OF THE INVENTION

While many businesses have adopted computer systems to maintain records required to determine the status of various aspects of their business, there are others which because of cost or for other valid reason cannot justify or even require such extensive, complicated and skill requiring equipment and to this latter segment, the instant invention is directed.

This invention provides for many aspects of record keeping in a relatively simple system embodying manual aspects to set forth information necessary and desirable as well as to indicate the status of operations for ease of viewing and changing the information as changes in the status of operations take place.

In the instant invention there is provided a record system which includes the essential elements of product manufacture, such as sales, inventory, materials and supplies, with signaling means integral with such records and availing of the size and position of each individual record element to inform the viewer of the conditions existing and likewise to keep record of actions taken.

GENERAL DESCRIPTION OF THE INVENTION

The invention hereof avails of what may be termed master record cards and a series of separate operation description and status cards, associated with such master record card so as to provide a substantial amount of information, including a description of the operation to be performed where the same is applicable, the various elements of sales, inventory and material as well as supplies required in carrying out manufacturing processes of one kind or another.

To those cards which may be termed the operation cards, the same contain a description of the operation to be performed, a well as suitable spaces for numbers of various kinds as well as prices and so forth which are related to this consideration.

The operation cards include the description of the operation to be or being performed and are exemplary of the system, specific examples including a card which relates to "sales" the operation being described as "no activity at present" or "customer was contacted" or simply "active".

Another card in this series, related to "inventory", involves the various operations and may be "none on hand" or "manufacturing in process" or "on hand".

Similarly another card may be provided entitled "materials" the operations being stated as "issue order required" or "on order" or "received, on hand".

Another card which has descriptive matter thereon of similar nature, as it relates to the various aspects of manufacturing, involves a further operation classification entitled "supplies" being a fourth card and includes an operation description like that for "materials" set forth in the "supplies" card just referred to, including "issue order required", "on order" and "received, on hand".

The status of each of the operations described on each separate card is in turn established by the use of indicia which provide a signal to inform an observer, which indicia may be by color as red, suggesting immediacy, yellow for indicating an intermediate condition, and green when the operation is proceeding or does not require attention.

While colors are associated with the conditions above stated and are probably more readily indicative to most people, other indicia may be availed of where they have comparable significance, such as the numbers including the simple numbers 1, 2, or 3 for example, or even star symbols in suitable series might also be used to furnish the necessary order in which attention should be paid as indicated.

In order to best avail of the information which is provided by the foregoing, the cards themselves are of different sizes which may also be significant, but even more, provide for observation of marginal notations such as a title or description of the operation as it is broadly classified herein.

Thus the notation may be "sales status" here availed of in relation to manufacturing.

Further the operation cards are square and provided with means to maintain them in position with respect to one another whereby marginal areas of all cards in a series may be viewed simultaneously.

Since the indicia referred to initially are positioned in the margin, when the cards are arranged with the largest in the rear and each one forward thereof being smaller, at least certain of the indicia on each card will also be simultaneously in view.

Thus if the cards are positioned with their left and lower margins in alignment, the indicia appearing in right hand corner of each will all be in sight in each series.

Further these corners will lie diagonally with respect to the entire series, and when color comprises the indicia, the differences on each card, if there be such difference, may be especially significant to the viewer, symbols or other numbers may be equally useful under some circumstances, and obviously similarity in colors will likewise be recognized.

It is more specifically contemplated that for each complete part or complete unit being manufactured or other object to which the concept is adaptable, wherein and of itself comprise a unit, and the various status cards called operation cards will be in a series related to each of the master cards provided.

Other details of the concept herein, will be more clearly understood, in the detailed description appended hereto and disclosed in the drawing wherein:

FIG. 1 is a view showing the record cards in assembled operative position with relation to one another.

FIG. 2 is a plan view as well of an individual record card which is one of the operation description status cards and specifically the smallest one.

FIGS. 3, 4 and 5 are similar cards directed to other aspects of the operations, and each of successively larger size.

FIG. 6 is a plan view of the master record card with which all the cards are associated.

DETAILED DESCRIPTION OF THE INVENTION

Referring now to FIG. 1 the master record card designated 1, and shown by itself in FIG. 6, is a generally rectangular card of reasonably large size, about 6 to 10 inches in dimension, with the various information lines 2 and 3 at the upper edge portion thereof, and certain nomenclature indicated on other lines arranged diagonally in the upper right hand corner and designated 4. This is denominated the master record card as previously indicated, and is adapted and provided with at its lower edge with a series of notches designated 5, which in turn engage corresponding mating members in a suitable drawer or other position where the card will stand upright and may be viewed by leaving from one card to another, the diagonal upper right hand corner information being exposed in successive cards.

Associated with the master record card 1, is the series of one or more operation description status cards, designated 6, 7, 8 and 9 in this instance as a typical example of a source of information which will be helpful in reference to the overall information which is desired for the record in the master card which basically involves the provision thereon of suitable places to enter orders and shipments of the article or articles manufactured with reference to the master record card 1.

It will be observed that the cards 6 to 9 inclusive, are square, and in each instance have rounded corners primarily for handling purposes and each card being progressively larger in the order of numbers as indicated so that the upper margins of the cards are all visible and in this instance the right hand margins are visible because the left hand margins are in alignment, with the bottom margins likewise in alignment.

The cards each are provided with notches 6a for the card 6, being the notches at the left hand margin of that card 6b for the notches at the bottom margin of the card and 6c for notches at the right hand margin of the card.

Similar notches 7a, 7b, and 7c are formed in the card number 7 which happens to be denominated at the material status card.

A like situation exists with respect to the cards 8 and 9 wherein the respective notches of each are subtended with the letters a, b, and c to indicate the respective margin notches of each card as is understood from a consideration of FIGS. 3, 4, and 5.

Sales status card denominated 9, being the largest is in rear of the other cards, 8 being the inventory status card, 7 the material status card, and 6 the supplies status card in the system specifically being described at this point.

Further each of the cards is provided at three of the respective corners with color indicia signal elements, in this instance the card 6 being provided with a yellow color designation 6d, at its upper left hand corner, a red element 6e at the right hand upper corner, and 6f at the lower right hand corner being green in color.

It should be clearly understood that while colors are described in each case, numbers such as 1, 2 or 3 could be likewise applied where a code is developed to indicate the purpose of the signal element as the green being everything in order and red some attention to be paid and yellow that there may be some suitable action required in the near future or in process which is necessary to meet as a time schedule or the like.

The yellow color in each case has a common meaning for each of the status or operation cards, specifically for example in the card 9, the sales card, the yellow indicates that the customer was contacted, the card 8 the yellow indicates that the manufacturing is in process, that is for inventory purposes, and on the materials card 7, that the material is on order as likewise in the supplies card 6 that the supplies are on order.

The other colors or indicia or signal elements as the case may be may have suitable indication purposes and the red being in sales that there is no present activity, that being the card 9, the card 8 with reference to inventory, that there is none on hand, and in the card 7 that the materials require an order to be issued and the card 6 for supplies a like requirement of issuing order for materials or supplies.

The green or like comparable signal indicia or dement, may mean in the card 6 that the supplies are received and on hand, with the card 7 likewise having the green significance, and on the card 8 the green indicating that the inventory is on hand and on the card 9, the sales, that the same is in active status.

With the foregoing explanation of the detailed aspects of each of these cards, it will be readily observed that by suitable manipulation of each card a suitable signal element may be positioned, in the place where the red signal element is shown in FIG. 1 for example in each case. By way of description, it will be suggested that the master record card 1 here is for a particular piece of equipment which is being manufactured, whether a part thereof or other, and the red signal or element, which is denominated 9e, will be in the position shown in FIG. 1.

This indicates as will be apparent that there is no present activity taking place.

If for example the yellow signal in the card 8 and denominated 8d, had indicated that the customer was contacted this yellow signal element would be moved into the position in FIG. 1 now occupied therein by the red element 8e.

It will be obvious that the notches in the respective cards are intended to maintain the cards in their related positions so that the information thereon can be readily observed as to their marginal notations, and likewise when they are shifted into the various positions with the signals thereon in the upper right hand corner, that indicates the actual status of the particular part or operation being performed.

It will thus be apparent that a very versatile arrangement is provided which enables the shifting into position of various signal elements at particularly appropriate for the aspect of the parts or operation to be performed by manipulation of the cards since they are square the appropriate and desired signal element as to status will appear in the upper right hand corner and the various signal elements on all the cards will be in alignment as long as the cards are in related condition with the smallest area card in the front.

It should be understood that the notches in each case are desirable since they provide for the relative side to side positioning so that the margins of the cards on the left are in alignment as well as those on the bottom with the ones on the right indicative of various aspects of the operation being visible as well as the margins at the top likewise visible to show the information contained thereon.

It will thus be clear that where a series of master card units are provided and each master card in turn related to a group or series of operation cards, that an up-to-date status indication of all the various parts or elements in a given manufacturing setup can be readily determined and changes readily accounted for.

An alternative arrangement for indicating status, is described in relation to 1 and 6, where in the latter, it will be noted that master card 1 is provided with a series of openings in the right hand vertical margin denoted 10a, 10b, 10c, and 10d which are arranged to display the respective corners of the cards 6, 7, 8 and 9 indicated by the subtended letters associated with each of the respected corners.

For example in this arrangement the cards may be positioned with their right hand margins in each case, in alignment whereby the opening 10a will disclose corners of the card 9, being the corners 9d, 9e, and 9f and colored accordingly, yellow, red and green respectively. This applies similarly to corners 8d, 8e and 8f, as well as corners of cards 7 and 6.

Thus when reviewing the status of the separate elements represented by each card, the appropriate color will appear through such opening and immediate information is provided for all simultaneously. Numbers or other indicia if used would be similarly visible.

The notches on the edge lying at right angles to the right hand margin will maintain the cards in position for viewing the color or other indicia as described.

I claim:

1. A master record card and a series of one or more operation description status cards associated therewith, positioned in predetermined aligned contact relation thereto, each operation card being progressively smaller in area than a card positioned rearwardly thereof, to provide simultaneous viewing of an area in the margin of each operation card, a signal element in each margin for said simultaneous viewing when the cards are positioned as stated, the signal element indicating the status of the operation described in each operation card, each operation card being substantially square and provided with means to position such card with respect to the master card, each operation card including an area of a different color at certain of the corners, corresponding colors indicating a corresponding status of operation, the position of a specific color area being determinative of the status, at least three of said corners having a different color area at each, the cards being shiftable to move a color area into predetermined position to signify action required, the predetermined position for each color area in each series of operation cards being identically related to the master card.

* * * * *